United States Patent
Sneyders et al.

(10) Patent No.: US 11,954,878 B2
(45) Date of Patent: *Apr. 9, 2024

(54) DETERMINING IMAGE FEATURE HEIGHT DISPARITY

(71) Applicant: Raven Industries, Inc., Sioux Falls, SD (US)

(72) Inventors: Yuri Sneyders, Zemst (BE); John D. Preheim, Beresford, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,505

(22) Filed: Mar. 15, 2023

(65) Prior Publication Data

US 2023/0222678 A1 Jul. 13, 2023

Related U.S. Application Data (63) Continuation of application No. 16/926,449, filed on Jul. 10, 2020, now Pat. No. 11,615,543.

(Continued)

(51) Int. Cl.
*G06T 7/536* (2017.01)
*A01C 14/00* (2006.01)
(Continued)

(52) U.S. Cl.
CPC .............. *G06T 7/536* (2017.01); *A01C 14/00* (2013.01); *G06T 7/66* (2017.01); *G06T 7/90* (2017.01);
(Continued)

(58) Field of Classification Search
CPC ......... G06T 7/0004; G06T 7/90; G06V 20/10; G06V 7/143; G06F 18/22
See application file for complete search history.

(56) References Cited

U.S. PATENT DOCUMENTS

| | | |
|---|---|---|
| 4,555,725 A | 11/1985 | Geiersbach et al. |
| 5,442,552 A | 8/1995 | Slaughter et al. |

(Continued)

FOREIGN PATENT DOCUMENTS

| | | |
|---|---|---|
| CN | 105684412 B | 4/2017 |
| EP | 3528488 A1 | 8/2019 |

(Continued)

OTHER PUBLICATIONS

"U.S. Appl. No. 17/381,036, Response filed Feb. 14, 2023 to Non Final Office Action dated Nov. 14, 2022", 10 pgs.

(Continued)

*Primary Examiner* — Yosef Kassa
(74) *Attorney, Agent, or Firm* — Schwegman Lundberg & Woessner, P.A.

(57) ABSTRACT

A device to determine a height disparity between features of an image includes a memory including instructions and processing circuitry. The processing circuitry is configured by the instructions to obtain an image including a first repetitive feature and a second repetitive feature. The processing circuitry is further configured by the instructions to determine a distribution of pixels in a first area of the image, where the first area includes an occurrence of the repetitive features, and to determine a distribution of pixels in a second area of the image, where the second area includes another occurrence of the repetitive features. The processing circuitry is further configured by the instructions to evaluate the distribution of pixels in the first area and the distribution of pixels in the second area to determine a height difference between the first repetitive feature and the second repetitive feature.

20 Claims, 8 Drawing Sheets

Related U.S. Application Data (60) Provisional application No. 62/873,068, filed on Jul. 11, 2019.

(51) Int. Cl.
  *G06T 7/66* (2017.01)
  *G06T 7/90* (2017.01)
  *A01B 69/00* (2006.01)
  *A01D 75/00* (2006.01)

(52) U.S. Cl.
  CPC ............ *A01B 69/001* (2013.01); *A01D 75/00* (2013.01); *G06T 2207/30188* (2013.01)

(56) References Cited

U.S. PATENT DOCUMENTS

| | | | |
|---|---|---|---|
| 7,361,331 | B2 | 4/2008 | Brandle et al. |
| 7,570,783 | B2 | 8/2009 | Wei et al. |
| 7,792,622 | B2 | 9/2010 | Wei et al. |
| 8,019,513 | B2 | 9/2011 | Jochem et al. |
| 8,121,345 | B2 | 2/2012 | Joche et al. |
| 8,659,795 | B2 | 2/2014 | Nakamura |
| 8,698,834 | B2 | 4/2014 | Brown Elliott |
| 8,965,076 | B2 | 2/2015 | Garcia et al. |
| 9,064,151 | B2 | 6/2015 | Shamir et al. |
| 9,414,037 | B1 | 8/2016 | Solh |
| 9,462,749 | B1 * | 10/2016 | Jens ................. G06T 7/0004 |
| 9,583,527 | B1 | 2/2017 | Leung et al. |
| 9,818,791 | B1 | 11/2017 | Mao et al. |
| 9,928,584 | B2 * | 3/2018 | Jens ................. G06T 7/001 |
| 9,965,848 | B2 * | 5/2018 | Banerjee ............ G06T 7/0006 |
| 10,295,703 | B2 * | 5/2019 | Dybro ............... G01B 21/22 |
| 10,346,996 | B2 | 7/2019 | Shen et al. |
| 10,679,096 | B2 * | 6/2020 | Lee .................. G06T 7/001 |
| 10,713,542 | B2 | 7/2020 | Gui et al. |
| 10,713,765 | B2 | 7/2020 | Partin et al. |
| 10,803,311 | B2 * | 10/2020 | Halligan ............ G06V 10/25 |
| 11,100,648 | B2 | 8/2021 | Sneyders et al. |
| 11,184,507 | B2 | 11/2021 | Sneyders et al. |
| 11,606,478 | B2 | 3/2023 | Sneyders et al. |
| 11,615,543 | B2 | 3/2023 | Sneyders et al. |
| 11,704,810 | B2 | 7/2023 | Sneyders et al. |
| 2008/0065286 | A1 | 3/2008 | Han et al. |
| 2008/0065287 | A1 | 3/2008 | Han et al. |
| 2010/0063681 | A1 | 3/2010 | Correns et al. |
| 2011/0311106 | A1 | 12/2011 | Hiebl |
| 2012/0101695 | A1 | 4/2012 | Han et al. |
| 2012/0113225 | A1 | 5/2012 | Deppermann et al. |
| 2012/0287143 | A1 | 11/2012 | Brown Elliott |
| 2013/0235183 | A1 | 9/2013 | Redden |
| 2014/0180549 | A1 | 6/2014 | Siemens et al. |
| 2014/0254861 | A1 | 9/2014 | Nelson, Jr. |
| 2015/0324648 | A1 | 11/2015 | Wilson et al. |
| 2016/0188181 | A1 | 6/2016 | Smith |
| 2016/0253792 | A1 | 9/2016 | Xu et al. |
| 2017/0228595 | A1 | 8/2017 | Wilson et al. |
| 2017/0357851 | A1 | 12/2017 | Segalovitz et al. |
| 2019/0260909 | A1 | 8/2019 | Shibuya et al. |
| 2020/0020103 | A1 | 1/2020 | Sneyders et al. |
| 2020/0021716 | A1 | 1/2020 | Sneyders et al. |
| 2020/0043149 | A1 | 2/2020 | Partin et al. |
| 2020/0074630 | A1 | 3/2020 | Garcia et al. |
| 2020/0184733 | A1 | 6/2020 | Walton |
| 2021/0012517 | A1 | 1/2021 | Sneyders et al. |
| 2022/0044411 | A1 | 2/2022 | Sneyders et al. |
| 2022/0124221 | A1 | 4/2022 | Sneyders et al. |

FOREIGN PATENT DOCUMENTS

| | | | |
|---|---|---|---|
| EP | 3440627 | A4 | 12/2019 |
| EP | 3821423 | A4 | 3/2022 |
| GB | 2551396 | B | 10/2018 |
| JP | 5799634 | B2 | 9/2015 |
| WO | WO-2013110668 | A1 | 8/2013 |
| WO | WO-2016207875 | A1 | 12/2016 |
| WO | WO-2017175231 | A1 | 10/2017 |
| WO | WO-2017183034 | A1 | 10/2017 |
| WO | WO-2020014519 | A1 | 1/2020 |
| WO | WO-2020014519 | A9 | 1/2020 |
| WO | WO-2020014531 | A1 | 1/2020 |
| WO | 2021007554 | | 1/2021 |

OTHER PUBLICATIONS

"U.S. Appl. No. 17/381,036, Notice of Allowance dated Mar. 1, 2023", 11 pgs.

"European Application Serial No. 20837561.8, Extended European Search Report dated Jul. 4, 2023", 10 pgs.

Vidovic, Ivan, "Crop row detection by global energy minimization", Pattern Recognition, Elsevier, GB, 23-28 vol. 55, (Jan. 22, 2016), 68-86.

"Acquiring Images", In: The Image Processing Handbook, (Jul. 1, 2002), 77 pgs.

"U.S. Appl. No. 16/509,127, Non Final Office Action dated Nov. 17, 2020", 14 pgs.

"U.S. Appl. No. 16/509,127, Notice of Allowance dated Apr. 19, 2021", 9 pgs.

"U.S. Appl. No. 16/509,127, Response filed Mar. 17, 2021 to Non Final Office Action dated Nov. 17, 2020", 10 pgs.

"U.S. Appl. No. 16/509,158, Examiner Interview Summary dated Jul. 2, 2021", 3 pgs.

"U.S. Appl. No. 16/509,158, Non Final Office Action dated Feb. 1, 2021", 16 pgs.

"U.S. Appl. No. 16/509,158, Notice of Allowance dated Jul. 20, 2021", 8 pgs.

"U.S. Appl. No. 16/509,158, Response filed Jul. 1, 2021 to Non Final Office Action dated Feb. 1, 2021", 11 pgs.

"U.S. Appl. No. 16/509,158, Supplemental Notice of Allowability dated Nov. 1, 2021", 2 pgs.

"U.S. Appl. No. 16/926,449, Non Final Office Action dated Aug. 10, 2022", 8 pgs.

"U.S. Appl. No. 16/926,449, Notice of Allowance dated Nov. 30, 2022", 8 pgs.

"U.S. Appl. No. 16/926,449, Response filed Nov. 10, 2022 to Non Final Office Action dated Aug. 10, 2022", 13 pgs.

"U.S. Appl. No. 16/926,449, Supplemental Notice of Allowability dated Dec. 7, 2022", 2 pgs.

"U.S. Appl. No. 17/381,036, Non Final Office Action dated Nov. 14, 2022", 21 pgs.

"U.S. Appl. No. 17/381,036, Preliminary Amendment filed Nov. 3, 2021", 7 pgs.

"U.S. Appl. No. 17/512,330, Notice of Allowance dated Nov. 7, 2022", 8 pgs.

"U.S. Appl. No. 17/512,330, Preliminary Amendment filed Jan. 7, 2022", 8 pgs.

"European Application Serial No. 19833128.2, Extended European Search Report dated Feb. 1, 2022", 9 pgs.

"European Application Serial No. 19833128.2, Response filed Aug. 1, 2022 to Extended European Search Report dated Feb. 1, 2022", 26 pgs.

"European Application Serial No. 19833128.2, Response filed Sep. 2, 2021 to Communication Pursuant to Article 94(3) EPC dated Feb. 23, 2021", 9 pgs.

"European Application Serial No. 19834645.4, Extended European Search Report dated Mar. 25, 2022", 14 pgs.

"European Application Serial No. 19834645.4, Response filed Oct. 17, 2022 to Extended European Search Report dated Mar. 25, 2022", 120 pgs.

"European Application Serial No. 20837561.8, Response to Communication pursuant to Rules 161(2) and 162 EPC Filed Aug. 16, 2022", 29 pgs.

"International Application Serial No. PCT/US2019/041459, International Preliminary Report on Patentability dated Jan. 21, 2021", 7 pgs.

"International Application Serial No. PCT/US2019/041459, International Search Report dated Oct. 16, 2019", 2 pgs.

(56) References Cited

OTHER PUBLICATIONS

"International Application Serial No. PCT/US2019/041459, Written Opinion dated Oct. 16, 2019", 5 pgs.

"International Application Serial No. PCT/US2019/041475, International Preliminary Report on Patentability dated Jan. 21, 2021", 6 pgs.

"International Application Serial No. PCT/US2019/041475, International Search Report dated Oct. 8, 2019", 2 pgs.

"International Application Serial No. PCT/US2019/041475, Written Opinion dated Oct. 8, 2019", 4 pgs.

"International Application Serial No. PCT/US2020/041694, International Preliminary Report on Patentability dated Jan. 20, 2022", 10 pgs.

"International Application Serial No. PCT/US2020/041694, International Search Report dated Sep. 25, 2020", 2 pgs.

"International Application Serial No. PCT/US2020/041694, Written Opinion dated Sep. 25, 2020", 8 pgs.

Behfar, Hossein, et al., "Vision-Based Row Detection Algorithms Evaluation for Weeding Cultivator Guidance in Lentil", Modern Applied Science; vol. 8, No. 5, (2014), 224-232.

Hague, T., et al., "A bandpass filter-based approach to crop row location and tracking", Mechatronics 11, (2001), 1-12.

Haykin, et al., "Signals and Systems", John Wiley & Sons, Inc., 2nd edition, (2005), 291-292 and 307-308.

Zheng, Li-Ying, et al., "Multi-crop-row detection based on strip analysis", 2014 IEEE International Conference on Machine Learning and Cybernetics, (Jul. 13, 2014), 611-614.

"European Application Serial No. 20837561.8, Response filed Jan. 29, 2024 to Extended European Search Report dated Jul. 4, 2023", 18 pgs.

\* cited by examiner

DETERMINING IMAGE FEATURE HEIGHT DISPARITY

CLAIM OF PRIORITY

This application is a continuation of U.S. application Ser. No. 16/926,449, filed Jul. 10, 2020, which claims the benefit of priority to U.S. Patent Application Ser. No. 62/873,068, filed on Jul. 11, 2019, which applications are incorporated by reference herein in their entirety.

TECHNICAL FIELD

This document pertains generally, but not by way of limitation, to computer vision systems and more specifically to determining image feature height disparity.

BACKGROUND

Modern agricultural operations generally include the use of agricultural machines (e.g., tractors, harvesters, sprayers, seeders, tillers, combines or like) to process fields, such as by planting, harvesting, or generally tending crops. Such agricultural machines can include control systems that automate, or assist operators in, the execution of these operations. In an example, a control system can help an agricultural machine navigate through a field planted in row crops to ensure that tracks or wheels of the machine remain in the furrows between the crop rows while implements track or following specified paths relative to crop rows.

A computer vision system can improve the automation of agricultural operations, such as by providing a control system of an agricultural machine with guidance information that can have a higher resolution than information provided by external guidance systems or information that may be unavailable to external guidance systems. A computer vision system generally includes sensors, such as cameras, mounted on the agricultural machine to capture images that include features of a field or environment. A computer vision system can also include processing circuitry to analyze captured images to extract information that is useful for guiding an agricultural machine.

In an example, images captured by a computer vision system can include features, such as crop rows and furrows. It may be desirable to analyze such images to identify which feature is a crop row and which feature is a furrow.

SUMMARY

Aspects of the present disclosure are based on the inventors' recognition that, among other things, it can be useful for a computer vision system to distinguish (e.g., identify) features in an image, such as crop rows and furrows. In an example, a control system can be configured to guide an agricultural machine through a field of row crops according to a trajectory or plan that requires the machine, or an implement coupled to the machine, to follow a centerline of a crop row. A computer vision system that can distinguish between a crop row and a furrow can enable the control system to automatically (e.g., in real time with limited or no user input) adjust the trajectory of the agricultural machine to track an indicated center line of the crop row, and thereby precisely navigate a field with minimal (e.g., no or decreased) damage to crops.

Aspects of the present disclosure provide techniques (e.g., devices, methods, systems, and computer readable mediums) for analyzing images that have two or more repeated features to differentiate between features based on their distance from a camera that captured the images. Such differentiation is accomplished by determining a height difference between two features. Existing techniques for determining height differences require the use of stereoscopic sensors or cameras that observe a target from slightly different perspectives to determine depth. Aspects of the present disclosure includes techniques that use a single sensor, such as a single camera, to determine height differences between two features in an image based on differences in the distribution (e.g., spatial distribution) of the pixels representing each feature. Variations in the distributions of pixels can be indicative of a difference in distances between the features and a camera or a difference in the perspective of the camera relative to the features. The provided techniques can be used to differentiate, without the use of additional sensors, between features in an image that have a physical height disparity. In an example, the techniques can identify crop rows, or differentiate between crop rows and furrow, in an image of a field because such crop rows are generally taller than neighboring furrows and as such are typically closer to a camera that used to capture the image.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Computer vision systems use cameras and other sensors to collect spatial information about environments, such as fields where agricultural machines operate to cultivate crops. Typical cameras capture three-dimensional (3D) environments in two-dimensional (2D) images. In some applications, it can be useful to obtain 3D information about an environment along with the 2D image captures, such as to capture, or preserve, 3D representations of the environment. Techniques for capturing or preserving 3D representations of environments include the use of range finding sensors, such as Light Detection and Ranging (LIDAR), time of flight devices, or radar devices to measure or calculate the distance from the sensor or image capturing device to features in the environments. Other techniques extrapolate 3D representations of an environment from captured images, such as by combining two or more 2D images to reconstruct a 3D scene. Such 2D images can be captured by stereo vision-based vision systems that are configured to transform pixel intensity levels from one or more color channel into disparity levels and distances to a camera. These 3D representations can be analyzed to determine distances to captured features.

It can be difficult for a computer vision system having only a single camera (e.g., a mono camera system) to determine distances to features that are captured in an image (e.g., a 2D image) without the use of additional sensors. Techniques for determining such distances can require a priori knowledge of the size of objects or features in an image. Such information may not be reliably available to a computer vision system, such as systems used in the guidance of agricultural machines. The size of crop row features, for example, can change over time as crops mature, die, and are harvested.

Aspects of the present disclosure include techniques for extracting relative distance information from a 2D image, such as an image captured by a mono camera system. Such information can be used to distinguish between features in the captured image based on disparities in their respective distances from the momo-camera system when there is a height disparity between features in the captured image. In some images, these disparities can manifest in the partial occlusion of one feature by another feature (e.g., an adjacent or neighboring feature) in an image. This occlusion can result in variations in the distribution of pixels that represent each feature in the images. Relative distance information can be extracted or determined from these variations, such as though analysis of the distribution of intensity levels or colors of pixels representing each feature. In an example, these techniques can be used to distinguish a crop row from a furrow in an image based on a disparity in their height or their respective distances from a camera that captured the image.

In an example, an environment represented in a 3D physical space coordinate system includes two or more features (e.g., types of objects) which have a height disparity relative to each other and are disposed in a repeated pattern. The repeated pattern can form a set of repeated features, such as repeated rows or lines, in an environment or in an image of the environment. The environment can include a field and the repeated features can include crop rows and furrows that traverse the field. A camera system (e.g., a mono camera system) can be used to capture one or more images of the environment, including at least two occurrences, or instances, of the repeated features. In an example, the camera system can be mounted on an agricultural machine or on an implement that is coupled to the agricultural machine. The camera system can be mounted at a height H that is measured normal to a ground plane (e.g., the field) and at an angle $\theta$ relative to the ground plane so as to capture images as the agricultural machine traverses the environment. The height or angle of the camera system can define a perspective of the camera system relative to environment and can be used to transform coordinates from the physical environment to a pixel space or image frame.

In an example, a first area of an environment (e.g., a physical space or 3D coordinate system area (e.g., a first sample area) within a field of view of the camera system) can be selected, or defined, to include an occurrence (e.g., a complete occurrence) of a first feature and a second feature (e.g., neighboring or adjacent features) of a set of repeated features. The selected first feature and second feature are indicative of, or form, one wavelength of a pattern defined by the repeated features. In an example, the first area can include any integer multiple of such wavelength (e.g., the first area can include one or more paired occurrences of the first feature and the second feature). The first area can be disposed at a first observation angle with respect to the camera system (hereinafter, "camera") or a ground plane. A second area (e.g., a second sample area) of the environment can be selected, such that the second area is substantially the same size as the first area and is disposed at a second observation angle that is different from the first observation angle. The second area can include different occurrences of the first feature and the second feature (e.g., one or more different wavelengths of the pattern formed by the first feature and the second feature). The first area and the second area (e.g., the physical space coordinates of the first area and the second area) can be transformed or mapped to the image frame (e.g., the coordinate space of an image of the environment captured by the camera), such as by using camera intrinsic or camera extrinsic information (e.g., perspective information).

Pixel information (e.g., pixel intensity, luminosity, color, location, etc.) of pixels in areas of the image corresponding to the first area and the second area can be sampled, such as to form a first data set and a second data set, respectively. The distributions of pixels (e.g., pixel information) in the first data set and the second data set can be analyzed to determine a height difference, or disparity, between the first feature and the second feature. If there is a height difference between the first feature and the second feature, the distribution of the data set with the largest observation angle will have more pixels corresponding to the feature that is closest to the camera system (e.g. the tallest feature), such as due to occlusion of pixels of the other feature (e.g., the shorter) by pixels of the closer (e.g., higher or taller) feature. In some examples, additional distributions (e.g., distributions corresponding to other areas from which pixels are sampled) can be used to improve the analysis.

The discussed data sets, or the distributions of the data sets, can be analyzed using any technique for comparing distributions. In an example the data sets can be analyzed by calculating, or determining, the centroid or mean pixel color or mean intensity level of each data set. In an example where the data sets are analyzed in a coordinate space (e.g., a pixel space, an image space, a color space, or any combination thereof), the centroid or mean level will shift towards the pixel color or intensity associated with the feature nearest to the camera for increasing observation angle. In another example, the observation angle of the first sample area, the observation angle of the second sample area, and the difference in pixel distributions of the first sample area and the second sample area can be used to calculate a height difference between the first feature and the second feature. The distribution of pixels can be represented as a value that is indicative of a density of a type of pixel in the first area or the second area (e.g., a density of pixels that represent the first feature or the second feature), a ratio of pixels of a first type to pixels of a second type, or any other value useful for summarizing the distributions or data sets. A height difference between the first feature and the second feature can be calculated as a ratio of the difference in the distributions (e.g., $O_1$ and $O_2$, respectively) to a difference between the observation angles of each sample area ($\theta_1$ and $\theta_2$, respectively), as shown below.

$$\text{height difference} = (O_1 - O_2)/(\tan(\theta_1) - \tan(\theta_2)) \qquad (1)$$

Figure 1:
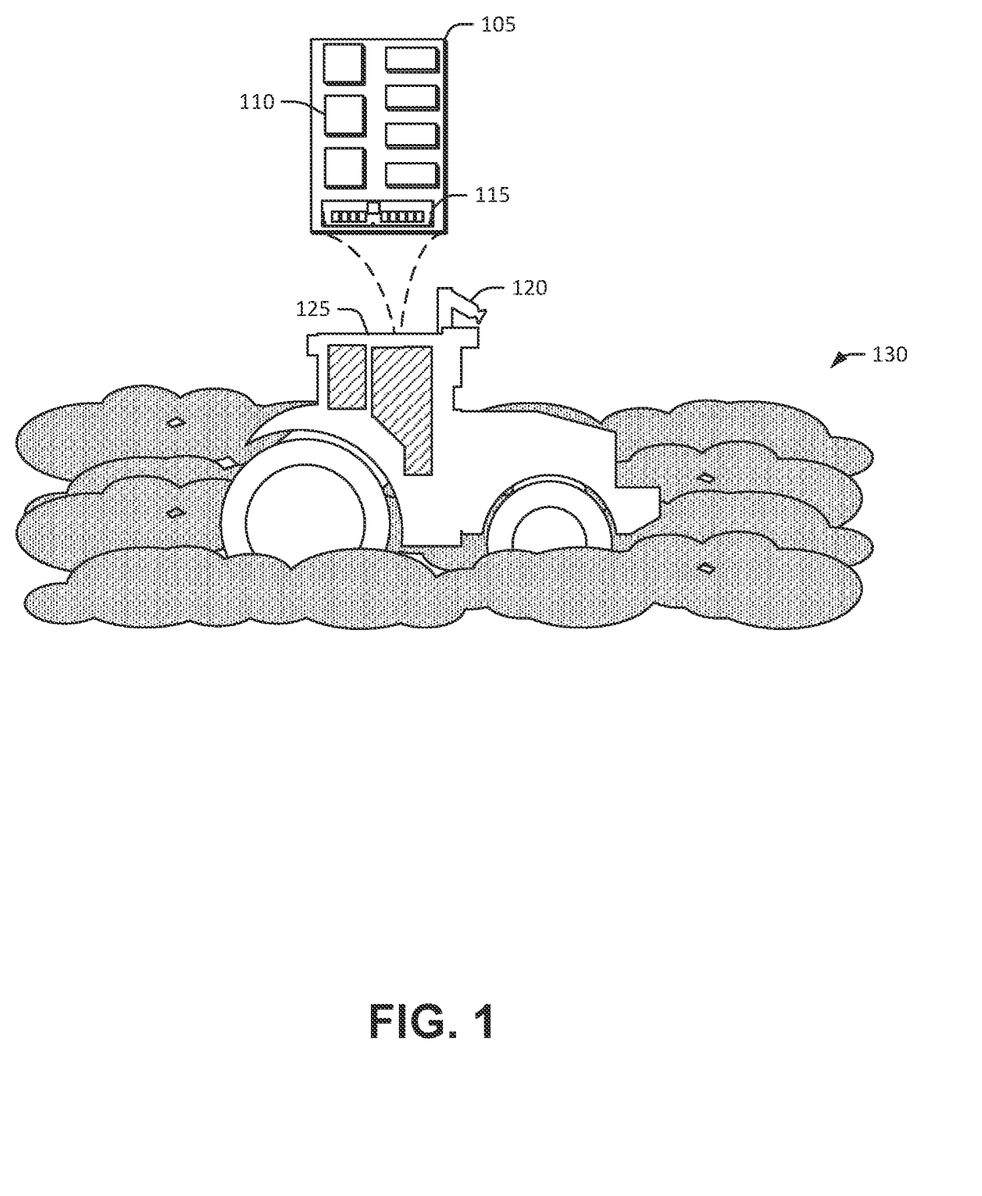
FIG. 1 illustrates an example of an environment including a system for determining a height disparity between features of an image.

FIG. 1 illustrates an example of an environment including a system 105 for determining a height disparity between features of an image, according to an example. The environment includes an agricultural machine 125, such as a tractor, truck, drone, or other vehicle situated proximate to crop related rows. The agricultural machine 125 includes a sensor 120, such as a camera, and the system 105. The sensor 120 operates by receiving light, which can be in the visible spectrum, ultraviolet, or infrared, or combinations thereof. In an example, the sensor 120 is an element of a mono camera system. The output of the sensor 120 can include an image having elements (e.g., pixels, regions, etc.) that represent wavelengths (e.g., colors) or intensities (e.g., luminance) of light. In an example, the sensor 120 can be mounted on an implement (not shown) attached to the agricultural machine 125.

The system 105 can include processing circuitry 110 and a memory 115 (e.g., computer readable media). The processing circuitry 110 can be configured to perform or implement any of the operations of techniques described herein. The memory 115 is arranged to hold data and instructions for the processing circuitry 110. The agricultural machine 125 can be arranged to obtain an image of the environment 130 that includes two or more repeated features, such as crop rows and furrows. Here, obtaining the image can include the processing circuitry 110 retrieving the image from a buffer (e.g., in the memory 115) or receiving the image from another source, such as, directly from the sensor 120 via direct memory access (DMA) or the like. As illustrated, the repeated features can be arranged in the image such that they extend from the bottom of the image to the top (e.g., in a columnar orientation) with respect to the sensor 120.

In an example, the image is a color image, where a first repeated feature is primarily represented by a first color and a second feature is primarily represented by a second color. In another example, the image is an intensity image having one or more channels. An intensity image has a single value representation for any point in the image. Thus, in an example, the intensity image is implemented as a grayscale image. In an example, a crop row is lighter (e.g., has a greater point or pixel intensity value) than a furrow. Generally, a standard grayscale image uses luminance as the intensity measured at any given pixel. However, different manipulations to a color image can be performed to, for example, increase the contrast between different types of crop related rows. Thus, for example, if a crop row is a first color and a furrow is a second color, then the first color can be scaled to be the most intense and the second color scaled to be the least intense. In an example, the intensity image is binary, with positions being either one value (e.g., a one) or another value (e.g., a zero). Such an image can be easier to process and store that other images, and can be achieved in several ways, including threshold clustering.

Figure 2A:
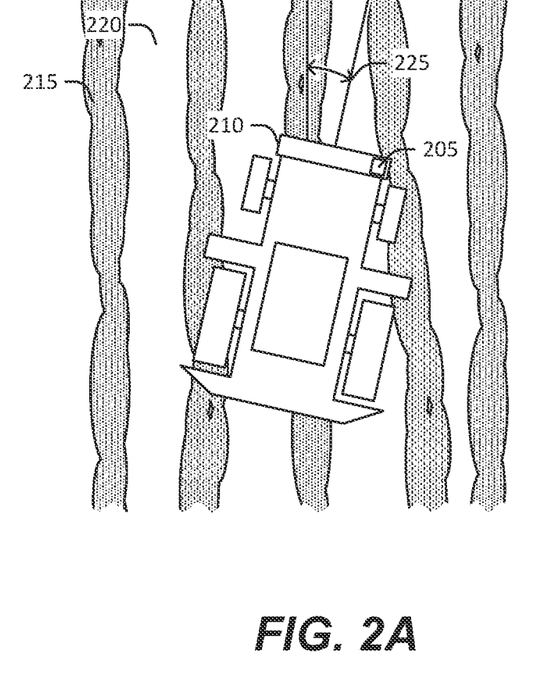
FIG. 2A illustrates an example of a top-down view of an agricultural machine in a field.
Figure 2B:
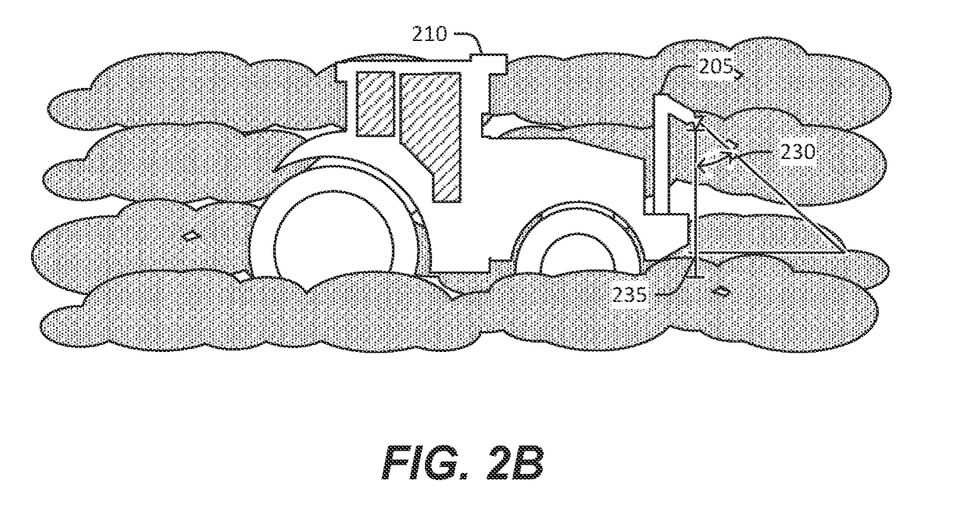
FIG. 2B illustrates an example of a side view of the agricultural machine 210 with the front mounted sensor.

FIGS. 2A-2B illustrate various components and relationships of an agricultural machine in an operating environment, according to an embodiment. FIG. 2A illustrates an example of a top-down view of an agricultural machine 210 in a field. The shaded portions of FIG. 2A represent crop rows 215 and the space between the crop rows 215 are indicative of furrows 220. The agricultural machine 210 includes a sensor 205 (e.g., a camera system) mounted to the front side of the agricultural machine 210. Here, the agricultural machine 210 is not aligned with the crop rows 215 or furrows 220 but, instead, deviates by an angle or distance 225. A control system of the agricultural machine 210 is arranged to steer the agricultural machine 210 to be in line with the crop rows 215 with wheels in the furrows 220. Such control system can include, or can be associated with, a computer vision system that is configured to identify or distinguish image features based on relative height differences, as described herein.

FIG. 2B illustrates an example of side view of the agricultural machine 210 with the front mounted sensor 205 (e.g., a camera system). The height 235 of the sensor 205 and the angle to the ground 230 are perspective parameters that are useful for transforming physical space coordinates representing a selected area of an environment or field to an image frame.

Figure 3:
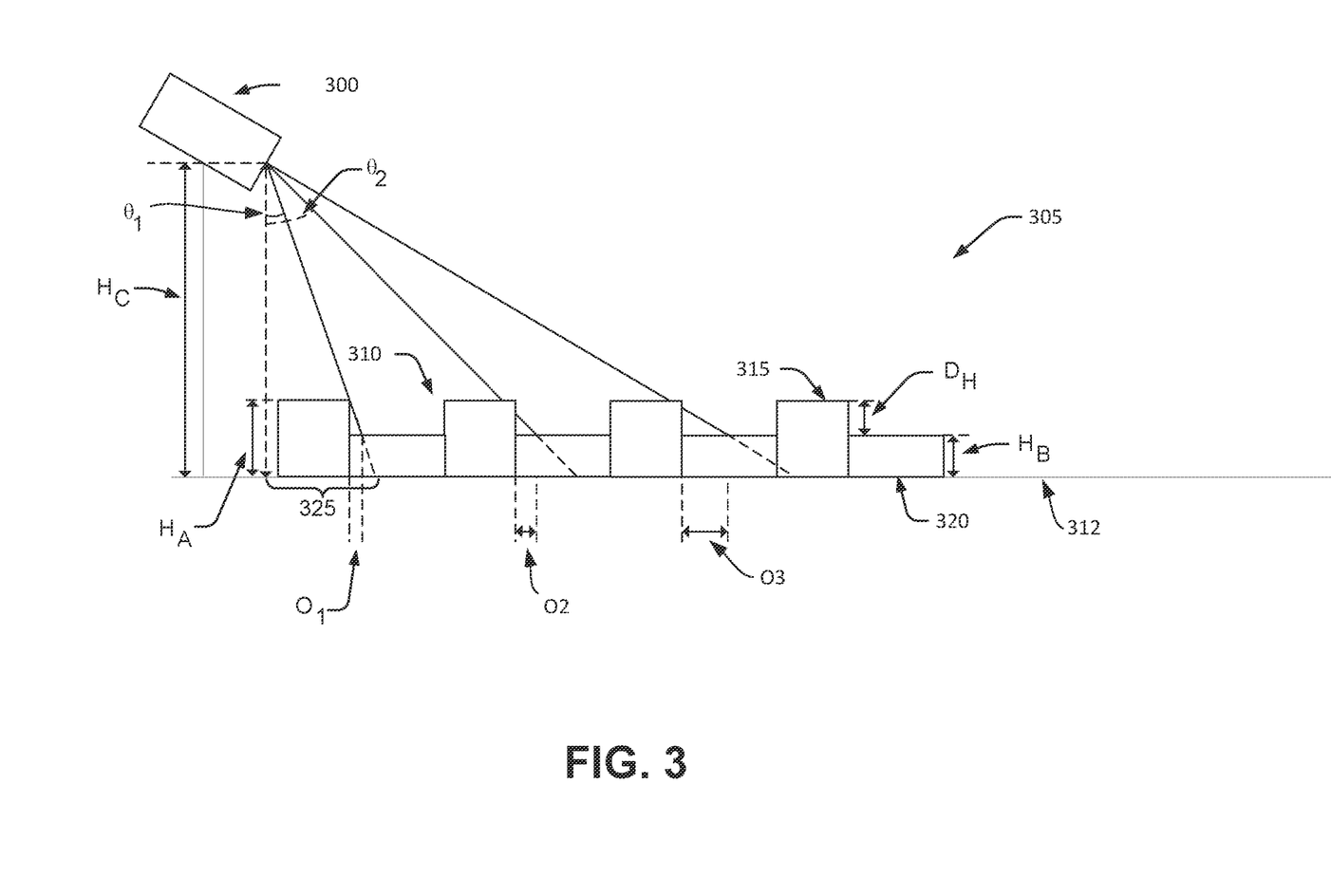
FIG. 3 illustrates an example of a camera system configured to capture images of an environment or field having two or more repeated features, according to an example.

FIG. 3 illustrates an example of a camera system 300 configured to capture images of an environment 305 having two or more repeated features 310. In an example, the camera system includes a camera, such as any of the cameras or optical sensors described herein, that is mounted on an agricultural machine at a height $H_C$ above the ground plane 312. In an example the camera system includes a digital camera that is configured to capture images of the repeated features 310 and provide the captured images to a machine controller, such as the machine controller 105. The two or more repeated features 310 can include two or more occurrences of a first feature 315 (feature A), such as a crop row, having a height $H_A$ and two or more occurrences of a second feature 320 (feature B), such as a furrow, having a height $H_B$.

FIG. 1 illustrates that a height difference (e.g., measured relative to ground plane 312 or as the difference $H_A - H_B$) between repeated features A and B can cause occluded regions in image captured by the camera system 300. The features further away from camera can be (partially) occluded by neighboring features that are located closer to camera. In an example, an area 325 of the environment 305 captured in an image by the camera system 300 at an observation angle $\theta$ have an occulated area $O_1$. The area $O_1$ represents an area of a first occurrence of feature B that is occluded by feature A in the captured image. The size (O) of the occluded area can be defined by the height difference ($D_H$) between features A and B, and the observation angle ($\theta_1$) as, $$O = D_H(\tan(\theta_1)).$$

Figure 4:
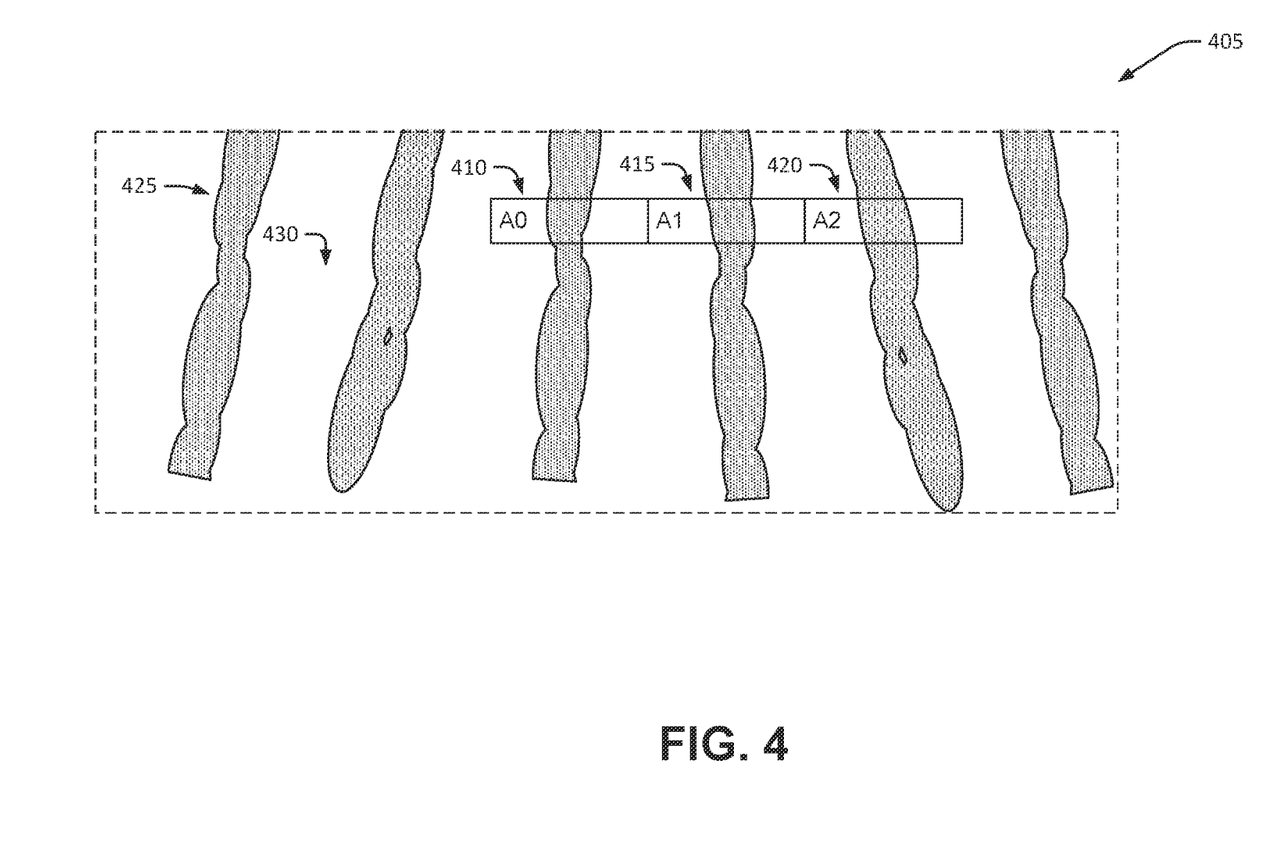
FIG. 4 illustrates an example of a selection of sample areas of an environment or field.

Increasing observation angle increases the size of the occluded region. In an example, the occluded area $O_2$ captured at a large observation angle $\theta_2$ is larger than the size of the occluded area $O_1$. The occluded areas $O_1$, $O_2$, and $O_3$ are indicative of a variation in the quantity of pixels of feature B that are represented in images captured by the camera system 300. are indicative of are indicative of a portion of the area of feature B that is occluded by feature A. Stated another way, a height difference between 2 features (e.g., feature A and feature B) will cause variable pixel distributions across a captured image. The resulting spatial variance in pixel distribution can be used to determine the nearest of both features or to indicate a relative the height difference between the features. In an example distribution of pixels associated with feature A will increase relative to the distribution of pixels associated with feature with increasing observation angle, indicating that feature A is taller (e.g., closer to the camera system 300) that feature B. FIG. 4 illustrates an example of a selection of sample areas 410 (e.g., A0), 415 (e.g., A1), and 420 (e.g., A2) of an environment or field 405. In an example, FIG. 4 illustrates the physical space selection of the sample areas 410, 415, and 420. In another example, FIG. 4 represent the sample areas 410, 415, and 420 transformed to an image frame, such as by using a homographic transformation. As shown in FIG. 4, the sample areas 410, 415, and 420 include at least one occurrence (e.g., wavelength) or a pattern formed by repeated feature 425 (e.g., a crop row) and repeated feature 430 (e.g., a furrow). In an example, sample area 410 has the smallest observation angle, while sample area 420 has the largest observation area.

Figure 5:
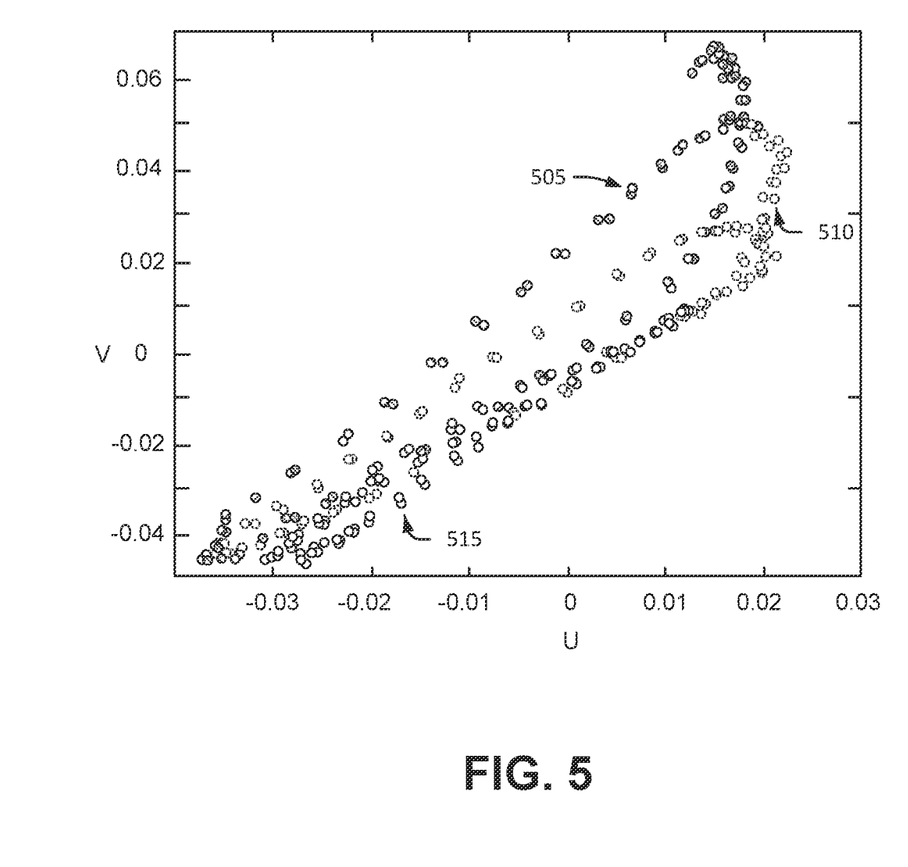
FIG. 5 illustrates an example of a distribution of sampled pixel data of sample areas in a UV color plane.

FIG. 5 illustrates an example of a distribution of sampled pixel data of sample areas 410, 415, and 420 (herein after, areas A0, A1 and A2) in a UV color plane (e.g., a YUV color space without the luma (Y) component). The distribution is generated using the pixel color values in selected areas A0, A1, and A2. The hashed values 505 correspond to samples from area A0. The dashed or broken values 510 correspond to samples from area A1. The solid samples 515 correspond to samples from area A2. As shown in FIG. 5, the distribution, such as the centroid, of the sample data shifts and concentrates towards the left bottom of the diagram, representing green in the UV color plane. For crop row and furrow features, the pixels containing more green (e.g., crop pixels) tend to be closer to the camera than the pixels containing less green (e.g. furrow pixels) in this example.

Figure 6:
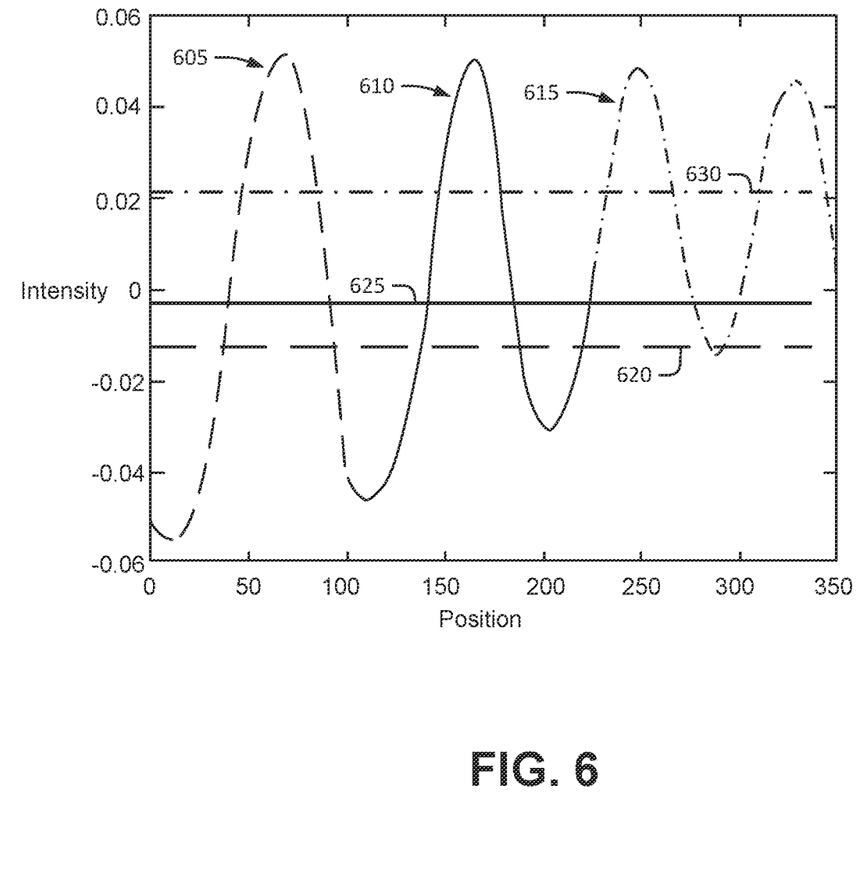
FIG. 6 illustrates an example of a distribution of sampled data having sampled data values (e.g., pixel values) represented as scalars.

FIG. 6 illustrates an example of a distribution of sampled data from areas A0, A1 and A2, where the sampled data values (e.g., pixel values) are represented as scalars. The vertical axis pixel represents pixel intensity level, while the horizontal axis represents horizontal image position (e.g., horizontal pixel position) starting from the left of A0 to right of A2). Sampled data from areas A0, A1, and A2 correspond to curves 605, 610, and 615, respectively. Line 620, 625, and 630 show the global intensity level of areas A0, A1, and A12, respectively. As shown in FIG. 6, global intensity level increases with increasing observation angle, corresponding perceived green in the original image.

Figure 7:
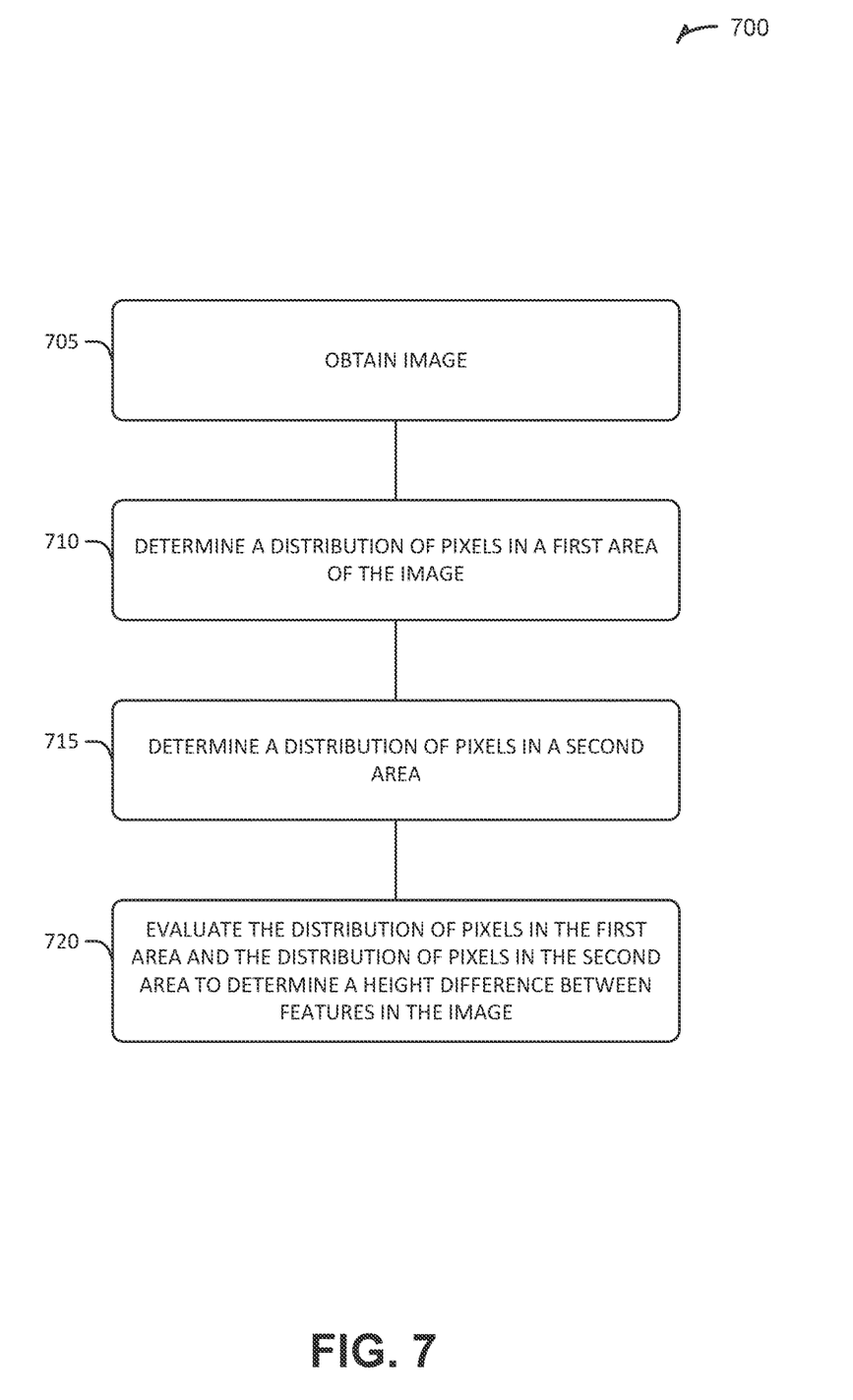
FIG. 7 illustrates an example of a process for determining a height disparity between features of an image.

FIG. 7 illustrates a process for determining a height disparity between features of an image, according to an example. A 705, an image can be obtained, such as from a camera system or a memory of computing device. The image includes a first repetitive feature and a second repetitive feature. At 710, a distribution of pixels in a first area of the image can be determined. The first area includes an occurrence of the first repetitive feature and an occurrence of the second repetitive feature. At 715, a distribution of pixels in a second area of the image can be determined. The second area includes another occurrence of the first repetitive feature another occurrence of the second repetitive feature. At 720, the distribution of pixels in the first area and the distribution of pixels in the second area can be evaluated, such as to determine a height difference between the first repetitive feature and the second repetitive feature, as described herein.

Figure 8:
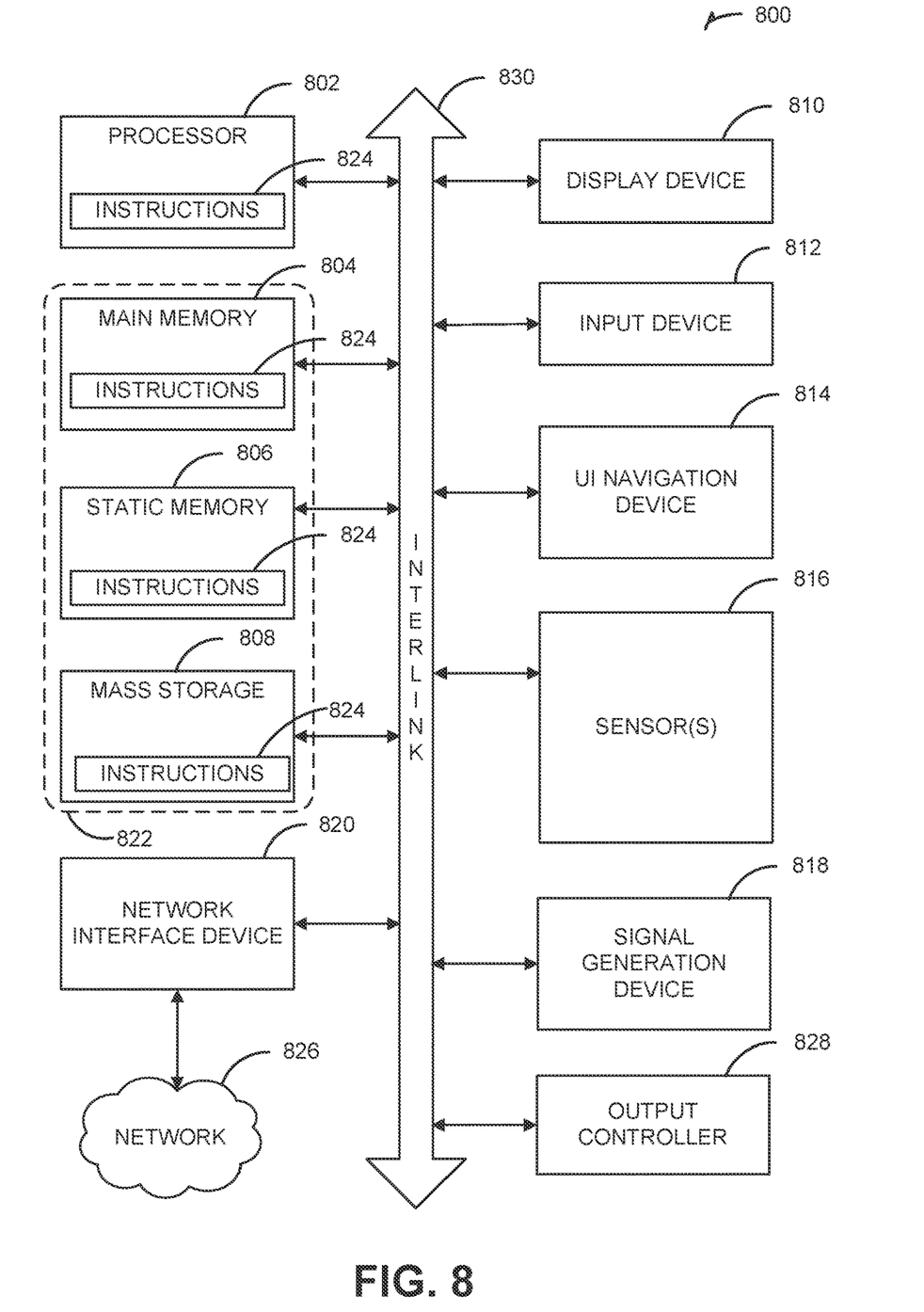
FIG. 8 illustrates a block diagram of an example machine upon which any one or more of the techniques (e.g., methodologies) discussed herein can perform.

FIG. 8 illustrates a block diagram of an example machine 800 upon which any one or more of the techniques (e.g., methodologies) discussed herein can perform. Examples, as described herein, can include, or can operate by, logic or a number of components, elements, or mechanisms in the machine 800. In an example the devices or systems described herein can include distribution, comparator, or transformation elements (e.g., software, circuitry, or mechanical components) that are configured to perform any of the techniques described herein.

Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 can include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drive, tape drive, flash storage, or other block devices) some or all of which can communicate with each other via an interlink (e.g., bus) 830. The machine 800 can further include a display unit 810, an alphanumeric input device 812 (e.g., a keyboard), and a user interface (UI) navigation device 814 (e.g., a mouse). In an example, the display unit 810, input device 812 and UI navigation device

814 can be a touch screen display. The machine 800 can additionally include a storage device (e.g., drive unit) 808, a signal generation device 818 (e.g., a speaker), a network interface device 820, and one or more sensors 816, such as a global positioning system (GPS) sensor, compass, accelerometer, or another sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 can be, or include, a machine readable medium 822 on which is stored one or more sets of data structures or instructions 824 (e.g., software) embodying or utilized by any one or more of the techniques or functions described herein. The instructions 824 can also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 can constitute the machine-readable media 822. While the machine readable medium 822 is illustrated as a single medium, the term "machine readable medium" can include a single medium or multiple media (e.g., a centralized or distributed database, and/or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

VARIOUS NOTES & EXAMPLES

Example 1 is a device to determine a height disparity between features of an image, the device comprising: a camera system to obtain an image, the image comprising a first repetitive feature and a second repetitive feature; and a machine controller comprising: a first distribution element configured to determine a distribution of pixels in a first area of the image, the first area comprising an occurrence of the first repetitive feature and an occurrence of the second repetitive feature; a second distribution element that is configured to determine a distribution of pixels in a second area of the image, the second area comprising another occurrence of the first repetitive feature and another occurrence of the second repetitive feature, and a comparator element configured to evaluate the distribution of pixels in the first area and the distribution of pixels in the second area to determine a height difference between the first repetitive feature and the second repetitive feature.

In Example 2, the subject matter of Example 1 includes, wherein the first image is captured by a mono camera system.

In Example 3, the subject matter of Examples 1-2 includes, wherein the second area is captured at a different observation angle than the first area.

In Example 4, the subject matter of Examples 1-3 includes, wherein the first repeated feature is a crop row and the second repeated feature is a furrow.

In Example 5, the subject matter of Examples 1-4 includes, wherein the comprises a transformation element that is configured to transform, prior to determining the distribution of pixels in the first area or the distribution of pixels in the second area, the first area and the second area to an image frame.

In Example 6, the subject matter of Examples 1-5 includes, wherein to obtain a distribution of pixels in the first area, the first distribution element is configured to calculate a centroid of a distribution of pixels in the first area in a color space.

In Example 7, the subject matter of Examples 1-6 includes, wherein the first distribution element is configured to obtain a distribution of pixels in the first area using an intensity level of pixels in the first area.

In Example 8, the subject matter of Example 7 includes, wherein the intensity level of pixels in the first area comprises a mean intensity level of pixels in the first area.

In Example 9, the subject matter of Examples 1-8 includes, wherein the first distribution element is configured to obtain a distribution of pixels in the first area based on an area of the first repeated feature that is occluded by the second feature.

In Example 10, the subject matter of Examples 1-9 includes, wherein to determine the difference in height between the first repetitive feature and the second repetitive feature, the comparator element is configured to calculate the difference in height using an observation angle of the first area and an observation angle of the second area.

In Example 11, the subject matter of Examples 1-10 includes, wherein to determine the difference in height between the first repetitive feature and the second repetitive feature, the comparator element is configured to calculate the difference in height using a difference between the first distribution and the second distribution.

In Example 12, the subject matter of Examples 1-11 includes, wherein: the first repeated feature comprises a first color, the second repeated feature comprises a second color, and to determine the difference in height between the first repetitive feature and the second repetitive feature, the is the comparator element is configured to identify, a color space, a shift in the distribution of pixels in the first area, relative to the distribution of pixels in the second area, towards the first color in a color space.

In Example 13, the subject matter of Examples 1-12 includes, wherein the machine controller comprises an element that is configured to identify, using the difference in height, a feature that is closet to a camera that captured the image.

Example 14 is a method for determining a height disparity between features of an image, the method comprising: obtaining an image, the image comprising a first repetitive feature and a second repetitive feature; determining a distribution of pixels in a first area of the image, the first area comprising an occurrence of the first repetitive feature and an occurrence of the second repetitive feature; determining a distribution of pixels in a second area of the image, the second area comprising another occurrence of the first repetitive feature another occurrence of the second repetitive feature, and evaluating the distribution of pixels in the first area and the distribution of pixels in the second area to determine a height difference between the first repetitive feature and the second repetitive feature.

In Example 15, the subject matter of Example 14 includes, capturing the first image using a mono camera system.

In Example 16, the subject matter of Examples 14-15 includes, wherein the second area is at a different observation angle than the first area.

In Example 17, the subject matter of Examples 14-16 includes, wherein the first repeated feature is a crop row and the second repeated feature is a furrow.

In Example 18, the subject matter of Examples 14-17 includes, transforming, prior to determining the distribution of pixels in the first area or the distribution of pixels in the second area, the first area and the second area to an image frame.

In Example 19, the subject matter of Examples 14-18 includes, wherein to obtain a distribution of pixels in the first area comprises calculating a centroid of a distribution of pixels in the first area in a color space.

In Example 20, the subject matter of Examples 14-19 includes, wherein obtaining a distribution of pixels in the first area comprises using an intensity level of pixels in the first area.

In Example 21, the subject matter of Example 20 includes, wherein the intensity level of pixels in the first area comprises a mean intensity level of pixels in the first area.

In Example 22, the subject matter of Examples 14-21 includes, wherein further comprising obtaining the distribution of pixels in the first area based on an area of the first repeated feature that is occluded by the second feature.

In Example 23, the subject matter of Examples 14-22 includes, wherein determining the difference in height between the first repetitive feature and the second repetitive feature comprises calculating the difference in height using an observation angle of the first area and an observation angle of the second area.

In Example 24, the subject matter of Examples 14-23 includes, wherein determining the difference in height between the first repetitive feature and the second repetitive feature comprises calculating the difference in height using a difference between the first distribution and the second distribution.

In Example 25, the subject matter of Examples 14-24 includes, wherein: the first repeated feature comprises a first color, the second repeated feature comprises a second color, and determining the difference in height between the first repetitive feature and the second repetitive feature comprises identifying, a color space, a shift in the distribution of pixels in the first area, relative to the distribution of pixels in the second area, towards the first color in a color space.

In Example 26, the subject matter of Examples 14-25 includes, identifying, using the difference in height, a feature that is closet to a camera that captured the image.

Example 27 is a machine readable medium including instructions for determining a height disparity between features of an image, the instructions, when executed by processing circuitry, cause the processing circuitry to perform operations comprising: obtaining an image, the image comprising a first repetitive feature and a second repetitive feature; determining a distribution of pixels in a first area of the image, the first area comprising an occurrence of the first repetitive feature and an occurrence of the second repetitive feature; determining a distribution of pixels in a second area of the image, the second area comprising another occurrence of the first repetitive feature another occurrence of the second repetitive feature, and evaluating the distribution of pixels in the first area and the distribution of pixels in the second area to determine a height difference between the first repetitive feature and the second repetitive feature.

In Example 28, the subject matter of Example 27 includes, wherein the operations further comprise capturing the first image using a mono camera system.

In Example 29, the subject matter of Examples 27-28 includes, wherein the second area is at a different observation angle than the first area.

In Example 30, the subject matter of Examples 27-29 includes, wherein the first repeated feature is a crop row and the second repeated feature is a furrow.

In Example 31, the subject matter of Examples 27-30 includes, wherein the operations further comprise transforming, prior to determining the distribution of pixels in the first area or the distribution of pixels in the second area, the first area and the second area to an image frame.

In Example 32, the subject matter of Examples 27-31 includes, wherein to obtain a distribution of pixels in the first area comprises calculating a centroid of a distribution of pixels in the first area in a color space.

In Example 33, the subject matter of Examples 27-32 includes, wherein obtaining a distribution of pixels in the first area comprises using an intensity level of pixels in the first area.

In Example 34, the subject matter of Example 33 includes, wherein the intensity level of pixels in the first area comprises a mean intensity level of pixels in the first area.

In Example 35, the subject matter of Examples 27-34 includes, wherein the operations further comprise obtaining the distribution of pixels in the first area based on an area of the first repeated feature that is occluded by the second feature.

In Example 36, the subject matter of Examples 27-35 includes, wherein determining the difference in height between the first repetitive feature and the second repetitive feature comprises calculating the difference in height using an observation angle of the first area and an observation angle of the second area.

In Example 37, the subject matter of Examples 27-36 includes, wherein determining the difference in height between the first repetitive feature and the second repetitive feature comprises calculating the difference in height using a difference between the first distribution and the second distribution.

In Example 38, the subject matter of Examples 27-37 includes, wherein: the first repeated feature comprises a first color, the second repeated feature comprises a second color, and determining the difference in height between the first repetitive feature and the second repetitive feature comprises identifying, a color space, a shift in the distribution of pixels in the first area, relative to the distribution of pixels in the second area, towards the first color in a color space.

In Example 39, the subject matter of Examples 27-38 includes, wherein the operations further comprise identifying, using the difference in height, a feature that is closet to a camera that captured the image.

Example 40 is at least one machine-readable medium including instructions that, when executed by processing circuitry, cause the processing circuitry to perform operations to implement of any of Examples 1-39.

Example 41 is an apparatus comprising means to implement of any of Examples 1-39.

Example 42 is a system to implement of any of Examples 1-39.

Example 43 is a method to implement of any of Examples 1-39.

The invention claimed is:

1. A device comprising:
an interface to a camera system; and
processing circuitry configured to:
obtain, via the interface, pixels from the camera system, the pixels of a scene observed by the camera system, the scene including a first repetitive feature and a second repetitive feature;
measure, in a first group of pixels from the pixels, a first ratio of pixels corresponding to the first repetitive feature and pixels corresponding to the second repetitive feature;
measure, in a second group of pixels from the pixels, a second ratio of the pixels corresponding to the first repetitive feature and the pixels corresponding to the second repetitive feature; and
determine a height difference between the first repetitive feature and the second repetitive feature based on a difference between the first ratio and the second ratio.

2. The device of claim 1, wherein the camera system is a mono camera system or a stereo camera system.

3. The device of claim 2, wherein the pixels are in a two-dimensional image created from sensors in the camera system.

4. The device of claim 1, wherein the device is included in a system that includes the camera system.

5. The device of claim 1, wherein the first group of pixels correspond to a first area of the scene and the second group of pixels correspond to a second area of the scene, wherein the camera system has a first observation angle to the first area of the scene and the camera system has a second observation angle to the second area of the scene, wherein the first observation angle is different than the second observation angle.

6. The device of claim 5, wherein the height difference is further based on the first observation angle and the second observation angle.

7. The device of claim 1, wherein the pixels corresponding to the first repetitive feature are identified by a color.

8. The device of claim 7, wherein the color corresponds to a centroid of colors of the first repetitive feature in the scene.

9. The device of claim 7, wherein the pixels corresponding to the second repetitive feature are identified by a second color that is different than the color.

10. The device of claim 1, wherein the pixels corresponding to the first repetitive feature are identified by an intensity level of the pixels.

11. A non-transitory machine readable medium including instructions that, when executed by processing circuitry, cause the processing circuitry to perform operations comprising:
obtaining pixels from a camera system, the pixels of a scene observed by the camera system, the scene including a first repetitive feature and a second repetitive feature;
measuring, in a first group of pixels from the pixels, a first ratio of pixels corresponding to the first repetitive feature and pixels corresponding to the second repetitive feature;
measuring, in a second group of pixels from the pixels, a second ratio of the pixels corresponding to the first repetitive feature and the pixels corresponding to the second repetitive feature; and
determining a height difference between the first repetitive feature and the second repetitive feature based on a difference between the first ratio and the second ratio.

12. The non-transitory machine readable medium of claim 11, wherein the camera system is a mono camera system or a stereo camera system.

13. The non-transitory machine readable medium of claim 12, wherein the pixels are in a two-dimensional image created from sensors in the camera system.

14. The non-transitory machine readable medium of claim 11, wherein the non-transitory machine readable medium is included in a device that is included in a system that includes the camera system.

15. The non-transitory machine readable medium of claim 11, wherein the first group of pixels correspond to a first area of the scene and the second group of pixels correspond to a second area of the scene, wherein the camera system has a first observation angle to the first area of the scene and the camera system has a second observation angle to the second area of the scene, wherein the first observation angle is different than the second observation angle.

16. The non-transitory machine readable medium of claim 15, wherein the height difference is further based on the first observation angle and the second observation angle.

17. The non-transitory machine readable medium of claim 11, wherein the pixels corresponding to the first repetitive feature are identified by a color.

18. The non-transitory machine readable medium of claim 17, wherein the color corresponds to a centroid of colors of the first repetitive feature in the scene.

19. The non-transitory machine readable medium of claim 17, wherein the pixels corresponding to the second repetitive feature are identified by a second color that is different than the color.

20. The non-transitory machine readable medium of claim 11, wherein the pixels corresponding to the first repetitive feature are identified by an intensity level of the pixels.

* * * * *